(12) United States Patent
Yoo et al.

(10) Patent No.: US 10,101,449 B2
(45) Date of Patent: Oct. 16, 2018

(54) METHOD FOR GENERATING SYNTHETIC IMAGE AND ULTRASONIC IMAGING APPARATUS USING SAME

(75) Inventors: Yang Mo Yoo, Gyeonggi-do (KR); Tai-Kyong Song, Seoul (KR); Jin Ho Chang, Seoul (KR); Jeong Cho, Seoul (KR); Jong Ho Park, Incheon (KR)

(73) Assignee: INDUSTRIAL COOPERATION FOUNDATION SOGANG UNIVERSITY, Seoul (KR)

( * ) Notice: Subject to any disclaimer, the term of this patent is extended or adjusted under 35 U.S.C. 154(b) by 875 days.

(21) Appl. No.: 13/997,848

(22) PCT Filed: Nov. 8, 2011

(86) PCT No.: PCT/KR2011/008440
§ 371 (c)(1),
(2), (4) Date: Oct. 10, 2013

(87) PCT Pub. No.: WO2012/091280
PCT Pub. Date: Jul. 5, 2012

(65) Prior Publication Data
US 2014/0071792 A1    Mar. 13, 2014

(30) Foreign Application Priority Data

Dec. 27, 2010 (KR) ........................ 10-2010-0135616

(51) Int. Cl.
*G01S 15/00* (2006.01)
*G01S 15/89* (2006.01)
*G01S 7/52* (2006.01)

(52) U.S. Cl.
CPC ...... *G01S 15/8904* (2013.01); *G01S 7/52047* (2013.01); *G01S 15/8997* (2013.01); *G01S 7/52026* (2013.01); *G01S 15/8915* (2013.01)

(58) Field of Classification Search
USPC ........................................... 367/11
See application file for complete search history.

(56) References Cited

U.S. PATENT DOCUMENTS 6,050,942 A * 4/2000 Rust et al. .................... 600/437
7,066,886 B2 * 6/2006 Song et al. .................... 600/443
(Continued)

FOREIGN PATENT DOCUMENTS

JP   2010-227503 A    1/2002
JP   2006-346161 A   12/2006
(Continued)

OTHER PUBLICATIONS

English Machine Translation of KR 10-2009-0000002.*
(Continued)

*Primary Examiner* — James R Hulka
(74) *Attorney, Agent, or Firm* — Womble Bond Dickinson (US) LLP

(57) ABSTRACT

The present disclosure relates to a method for generating a synthetic image. In the method, image data is generated using a receiving dynamic beamforming method, image data is generated using a synthetic aperture beamforming method, and the image data generated using the receiving dynamic beamforming method and the image data generated using the synthetic aperture beamforming method are synthesized with being applied with weighting factors according to advancing distances of ultrasonic waves. By using a zone blending method, in which image data according to a receiving dynamic beamforming method is mainly used for an ultrasonic image having a predetermined depth or less, and image data according to a synthetic aperture beamforming method is mainly used for an ultrasonic image having any other depth, a grating lobe and distortion of image brightness are eliminated. In addition, the non-uniformity of the image is compensated, and a uniform energy density is (Continued)

acquired even in an area near a virtual transmission sound source.

18 Claims, 5 Drawing Sheets

(56) References Cited

U.S. PATENT DOCUMENTS

2009/0299184 A1* 12/2009 Walker et al. ............... 600/447
2010/0242610 A1    9/2010 Karasawa
2011/0172538 A1*  7/2011 Sumi ........................... 600/453
2011/0237950 A1*  9/2011 Meng ........................... 600/447

FOREIGN PATENT DOCUMENTS

KR   10-2002-0000002 A   1/2002
KR   10-2009-0057837 A   6/2009

OTHER PUBLICATIONS

English Machine Translation of KR 10-2002-0057837.*
Bae. M.H. et al., *Bidirectional Pixel Based Focusing in Conventional B-mode Ultrasound Imaging*, Elec. Letter, vol. 24, No. 22 (1998) pp. 2105-2107.
Frazier, C.H. et al.., *Synthetic Aperture Techniques with Virtual Source Elements*, IEEE Trans. UFFC. vol. 45, No. 1 (1998), pp. 196-207.
International Search Report for Application No. PCT/KR2011/008440, dated May 24, 2012.

* cited by examiner

[Fig. 1]
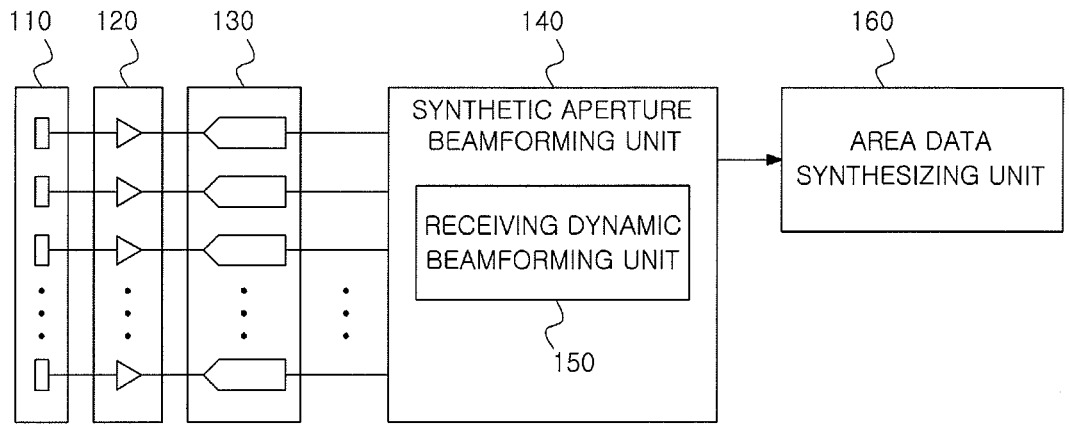
[Fig. 2]
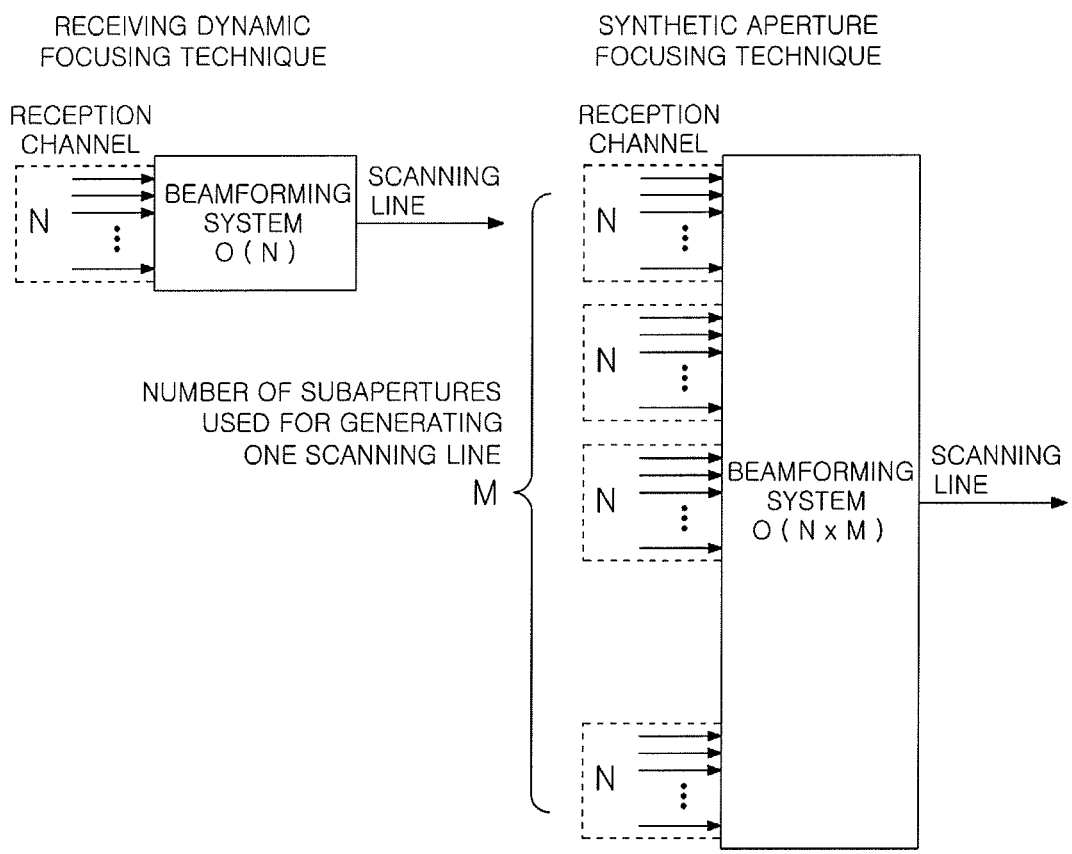

[Fig. 3]
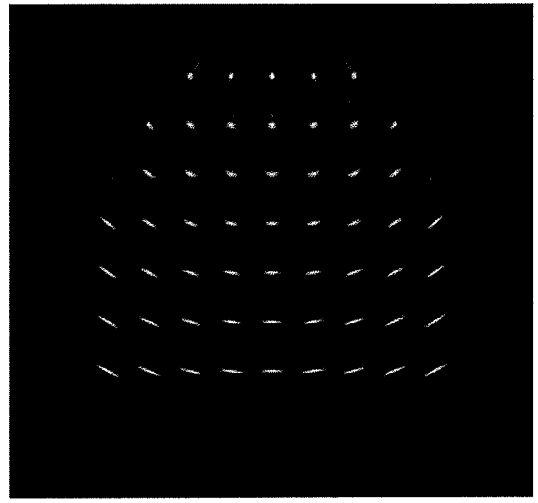
RECEIVING DYNAMIC BEA
MFORMING IMAGE
[Fig. 4]
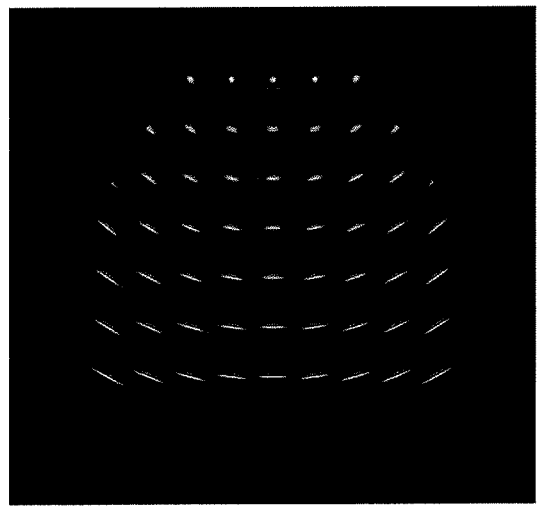
RECEIVING DYNAMIC
BEAMFORMING IMAGE

[Fig. 5]
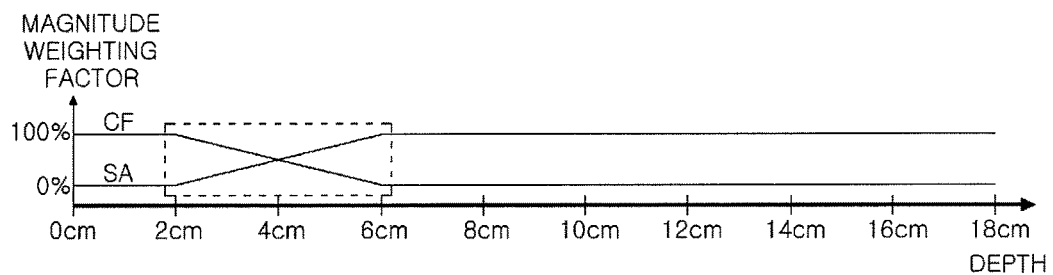
[Fig. 6]
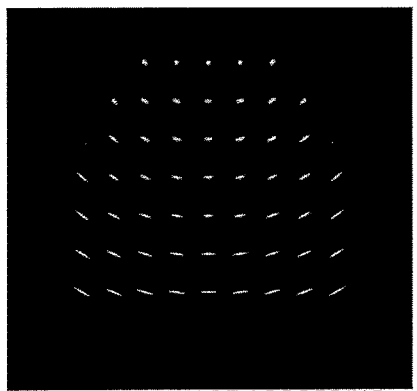
SYNTHETIC IMAGE ACCORDING
TO PRESENT DISCLOSURE

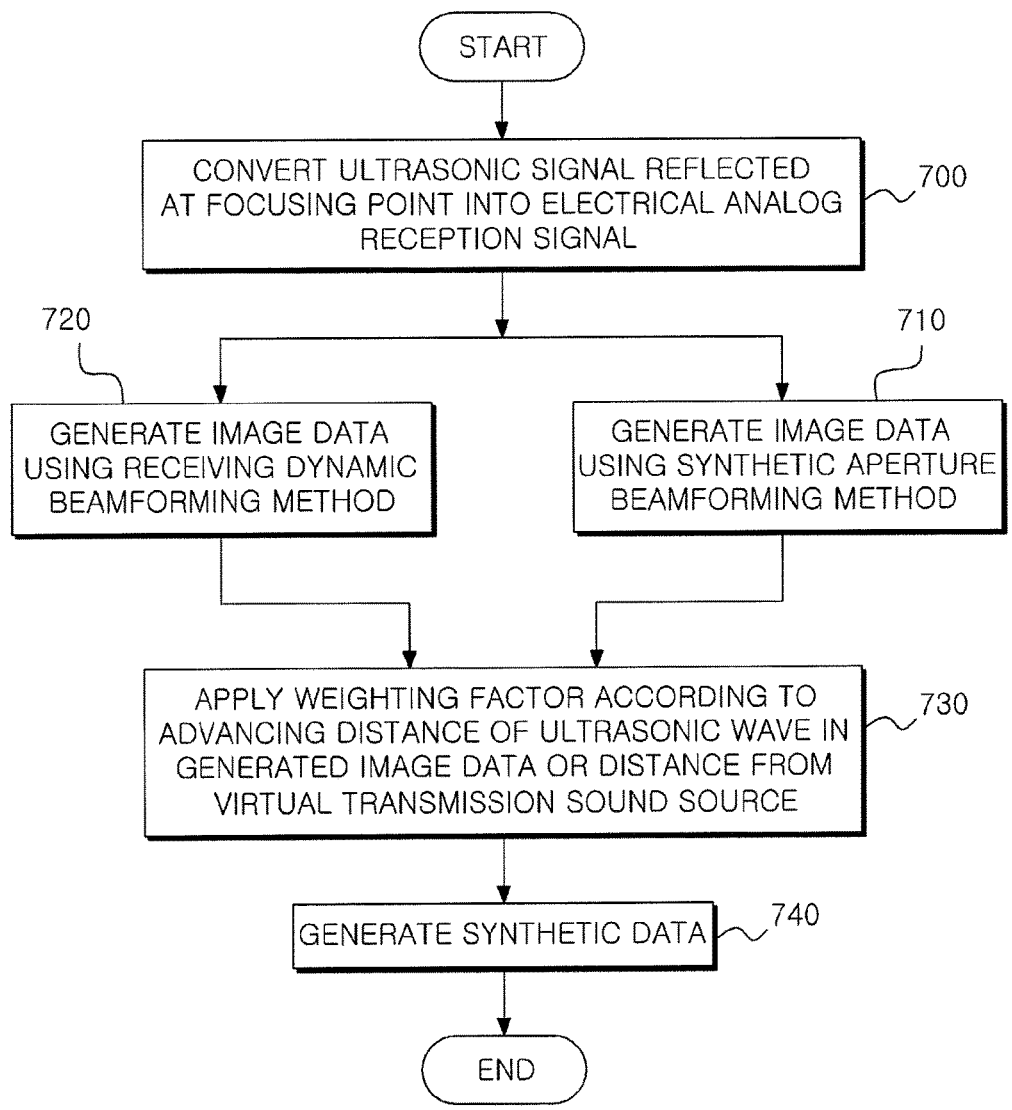

[Fig. 8]
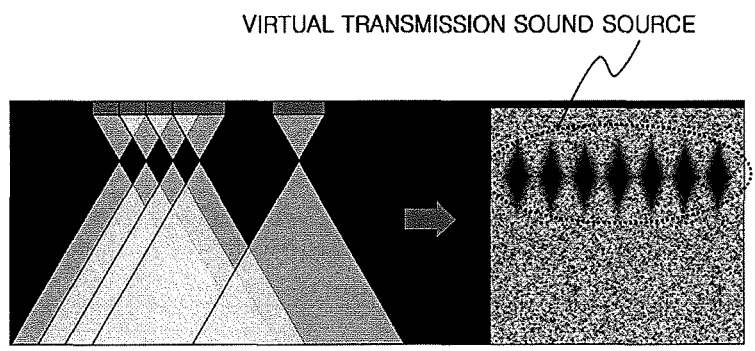

METHOD FOR GENERATING SYNTHETIC IMAGE AND ULTRASONIC IMAGING APPARATUS USING SAME

TECHNICAL FIELD

The present disclosure is directed to providing a method for generating a synthetic image, and more particularly, to a method for generating a synthetic image capable of eliminating a grating lobe and distortion of image brightness by using a zone blending method, in which image data according to a receiving dynamic beamforming method is mainly used for an ultrasonic image having a predetermined depth or less, and image data according to a synthetic aperture beamforming method is mainly used for an ultrasonic image having any other depth, and an ultrasonic imaging apparatus using the method.

In addition, the present disclosure relates to a method for generating a synthetic image capable of eliminating a grating lobe and distortion of image brightness by using a zone blending method, in which a weighting factor applied to image data according to the receiving dynamic beamforming method increases in an area adjacent to a virtual transmission sound source in a synthetic aperture beamforming method using the virtual transmission sound source and an ultrasonic imaging apparatus using the method.

BACKGROUND ART

In ultrasonic medical images, the resolutions are divided into an axial resolution and a lateral resolution. Generally, the axial resolution relates to the spectral width of ultrasonic beams, and a signal in the form of a pulse having a small temporal width is used so as to increase the axial resolution. Generally, the lateral resolution is determined by the width of a main lobe and is dependent on the size of a transducer and the used frequency, and the beams spread as ultrasonic waves advance inside a medium due to diffraction. Accordingly the lateral resolution is lower than the axial resolution. As a method for increasing the lateral resolution of an ultrasonic image, a focusing method is used.

For the focusing, there are a method in which beams are collected at a fixed focusing point using an acoustic lens and a method in which beams are electrically focused using a multi-channel array transducer.

When a multi-channel array transducer is used, by applying mutually-different time delay values to transducers, the focusing point may be changed to an arbitrary position, and a received signal may be dynamically focused for all the points on scanning lines. This is called a receiving dynamic focusing method, and, at this time, the transmit-focusing point, generally, is fixed as one.

In order to acquire an effect of collecting transmitted beams in the whole area, a synthetic aperture beamforming method may be used in which several signals separately transmitted and received overlap to be synthesized.

In the synthetic aperture beamforming method, an image is synthesized after all the scanned data, which is transmitted and received from one element each time, acquired by using a linear array transducer is stored in a memory.

In the case of a focusing method in the B-mode, focusing at the transmission may be performed only at a depth of one point, and, as focusing at the reception, dynamic focusing is used in which focusing is performed at all image depths through signal processing. Accordingly, while high resolution is implemented at a position near the transmit-focusing point, at a depth deviated from the focal point, the transmitted sound field has a large beam width due to diffraction, and accordingly, the resolution is low.

In a case where the synthetic aperture beamforming method is applied to an ultrasonic imaging apparatus, the resolution is further higher than that of an image acquired using a conventional beamforming method as the number of beams to be synthesized increases.

However, in the case of the synthetic aperture beamforming method, a condition of an element pitch, which is a gap between the centers of elements, being $\lambda/2$ or less (here, $\lambda$=velocity of acoustic wave/center frequency) needs to be satisfied. When the condition is not satisfied, a grating lobe occurs, whereby the image quality deteriorates.

Generally, the synthetic aperture beamforming method is applied to a linear array probe or a convex array probe, and a gap between elements of a commercial linear array probe or a convex array probe is equal to or greater than $\lambda$.

In addition, even in the case of a probe that is produced to have an element gap of $\lambda/2$ for a synthetic aperture, when there is a motion, in order to reduce the artifact, a sparse array may be applied, and a gap between elements used at this time may be $\lambda$ or more.

In a case where the sparse array is used, elements are used with elements corresponding to a predetermined constant being skipped when the whole image is acquired, and accordingly, a time required for acquiring one frame is shortened, whereby the motion artifact is reduced.

However, according to the synthetic aperture beamforming method, in a case where the condition of $\lambda/2$ is not satisfied, there is a disadvantage in that a grating lobe occurs at a low depth (0 to 4 cm), and thus, means solving such as problem is necessary.

In using the synthetic aperture beaming method, in order to improve the signal to noise ratio (SNR), a virtual transmission sound source technique may be used. In such a case, since weak energy arrives at an area between two virtual transmission points adjacent to each other so as to generate a shadow area, there is a disadvantage in that additional compensation therefor needs to be performed, and accordingly, means solving the problem is necessary.

DISCLOSURE

Technical Problem

A first object to be achieved by the present disclosure is to provide a method for generating a synthetic image capable of eliminating a grating lobe and distortion of image brightness by using a zone blending method in which image data according to a receiving dynamic beamforming method is mainly used for an ultrasonic image having a predetermined depth or less, and image data according to a synthetic aperture beamforming method is mainly used for an ultrasonic image having any other depth.

In addition, a method for generating a synthetic image is provided which is capable of compensating for the non-uniformity of an image occurring on the periphery of a virtual transmission sound source in a synthetic aperture beamforming method using a virtual transmission sound source by combining a synthetic aperture beamforming image and a receiving dynamic beamforming image.

A second object to be achieved by the present disclosure is to provide an ultrasonic imaging apparatus capable of eliminating a grating lobe and distortion of image brightness by using a zone blending method in which image data according to a receiving dynamic beamforming method is mainly used for an ultrasonic image having a predetermined depth or less, and image data according to a synthetic aperture beamforming method is mainly used for an ultrasonic image having any other depth.

In addition, an ultrasonic imaging apparatus is provided which is capable of compensating for the non-uniformity of an image occurring on the periphery of a virtual transmission sound source in a synthetic aperture beamforming method using a virtual transmission sound source by combining a synthetic aperture beamforming image and a receiving dynamic beamforming image.

Furthermore, a computer-readable recording medium having a program for performing the above-described method in a computer recorded thereon is provided.

Technical Solution

In one general aspect, there is provided a method for generating a synthetic image including: generating image data using a receiving dynamic beamforming method; generating image data using a synthetic aperture beamforming method; and synthesizing the image data generated using the receiving dynamic beamforming method and the image data generated using the synthetic aperture beamforming method with being applied with weighting factors according to advancing distances of ultrasonic waves.

In the aspect above, the image data generated using the receiving dynamic beamforming method may be configured as a part of the image data generated using the synthetic aperture beamforming method.

In addition, the weighting factor applied to the image data generated using the synthetic aperture beamforming method may be increased as an advancing distance of the ultrasonic wave increases.

In addition, the weighting factor applied to the image data generated using the receiving dynamic beamforming method may be decreased as an advancing distance of the ultrasonic wave increases.

In another general aspect, there is provided a method for generating a synthetic image including: generating image data using a receiving dynamic beamforming method; generating image data using a synthetic aperture beamforming method using a virtual transmission sound source; and synthesizing the image data generated using the receiving dynamic beamforming method and the image data generated using the synthetic aperture beamforming method with being applied with weighting factors changing in accordance with a distance from the virtual transmission sound source.

In the aspect above, the weighting factor applied to the image data generated using the receiving dynamic beamforming method may be increased in an area adjacent to the virtual transmission sound source.

In addition, the weighting factor applied to the image data generated using the synthetic aperture beamforming method may be decreased in an area adjacent to the virtual transmission sound source.

In another general aspect, there is provided an ultrasonic imaging apparatus including: a receiving dynamic beamforming unit having N reception channels and generating image data using a receiving dynamic beamforming method; a synthetic aperture beamforming unit having M as the number of subapertures used for generating one scanning line, having N as the number of reception channels, and generating image data acquired using a synthetic aperture beamforming method; and an area data synthesizing unit synthesizing the image data generated by the receiving dynamic beamforming unit and the image data generated by the synthetic aperture beamforming unit with being applied with weighting factors according to advancing distances of ultrasonic waves.

In another general aspect, there is provided an ultrasonic imaging apparatus including: a receiving dynamic beamforming unit having N reception channels and generating image data using a receiving dynamic beamforming method; a synthetic aperture beamforming unit having M as the number of subapertures used for generating one scanning line, having N as the number of reception channels, and generating image data acquired using a synthetic aperture beamforming method using a virtual transmission sound source; and an area data synthesizing unit synthesizing the image data generated by the receiving dynamic beamforming unit and the image data generated by the synthetic aperture beamforming unit with being applied with weighting factors changing in accordance with a distance from the virtual transmission sound source.

In another general aspect, there is provided a computer-readable recording medium on which a program used for causing a computer to perform the above-described method is recorded.

Advantageous Effects

According to the present disclosure, a grating lobe and distortion of image brightness are eliminated by using a zone blending method in which image data according to a receiving dynamic beamforming method is mainly used for an ultrasonic image having a predetermined depth or less, and image data according to a synthetic aperture beamforming method is mainly used for an ultrasonic image having any other depth.

In addition, according to the present disclosure, the non-uniformity of an image occurring on the periphery of a virtual transmission sound source in a synthetic aperture beamforming method using a virtual transmission sound source is compensated by combining a synthetic aperture beamforming image and a receiving dynamic beamforming image, and a uniform energy distribution is formed also in an area located near the virtual transmission sound source.

DESCRIPTION OF DRAWINGS

FIG. 1 is a configuration diagram of an ultrasonic imaging apparatus according to a preferred embodiment of the present disclosure.

FIG. 2 is a conceptual diagram that illustrates the calculation amounts according to a receiving dynamic beamforming method and a synthetic aperture beamforming method.

FIG. 3 is a diagram that illustrates an example of an image generated by a synthetic aperture beamforming unit 140 in a case where a transmission focusing distance is 2 cm.

FIG. 4 is a diagram that illustrates an example of an image generated by a receiving dynamic beamforming unit 150 in a case where a transmission focusing distance is 2 cm.

FIG. 5 is a diagram that illustrates an example in which weighting factors are applied to image data generated by the receiving dynamic beamforming unit 150 and image data generated by the synthetic aperture beamforming unit 140 by an area data synthesizing unit 160 in accordance with an embodiment of the present disclosure.

FIG. 6 is a diagram that illustrates an example of a synthesized image generated in accordance with an embodiment of the present disclosure in a case where a transmission focusing distance is 2 cm.

FIG. 7 is a flowchart that illustrates a method for generating a synthetic image according to a preferred embodiment of the present disclosure.

FIG. 8 is a diagram that illustrates an example of a synthesized image generated in accordance with another embodiment of the present disclosure in a case where a transmission focusing distance is 2 cm, and the position of a virtual transmission sound source is 2 cm.

BEST MODEL

Before specific contents of the present disclosure are described, for the convenience of understanding, an overview of a solution for solving an object to be achieved by the present disclosure or the core of a technical idea will be presented first.

According to an embodiment of the present disclosure, there is provided a method for generating a synthetic image including: generating image data using a receiving dynamic beamforming method; generating image data using a synthetic aperture beamforming method; and synthesizing the image data generated using the receiving dynamic beamforming method and the image data generated using the synthetic aperture beamforming method with being applied with weighting factors according to advancing distances of ultrasonic waves.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

FIG. 1 is a configuration diagram of an ultrasonic imaging apparatus according to a preferred embodiment of the present disclosure.

As illustrated in FIG. 1, the ultrasonic imaging apparatus according to this embodiment is configured by an array transducer 110, an amplifier 120, an analog-to-digital converter 130, a synthetic aperture beamforming unit 140, a receiving dynamic beamforming unit 150, and an area data synthesizing unit 160.

The array transducer 110 converts an ultrasonic signal reflected at a focusing point into an electrical analog reception signal. The array transducer 110 is included inside an ultrasonic probe.

The amplifier 120 amplifies the electrical analog reception signal converted in the array transducer 110.

The analog-to-digital converter 130 converts the amplified electrical analog reception signal into digital reception data. It is preferable that amplifiers 120 and analog-to-digital converters 130 are arranged in correspondence with the number of array transducers 110.

The synthetic aperture beamforming unit 140 divides the reception data converted by the analog-to-digital converter 130 into at least one or more groups, synthesizes the reception data for each group, and then, finally synthesizes the reception data synthesized for each group in accordance with a scan line to be generated with mutually-different weighting factors being applied to the reception data. At this time, the number of pieces of reception data for each group becomes a subaperture. The synthetic aperture beamforming unit 140 may use a synthetic aperture method using a virtual transmission sound source.

While the synthetic aperture beamforming method using a virtual transmission sound source is similar to the fixed transmission beamforming type, the above-described synthetic aperture beamforming method enables transmission/reception connections, in other words, bidirectional connections at all the image points by using stored raw format (RF) data corresponding to each scanning line.

While the synthetic aperture beamforming method increases the size of the ultrasonic transducer by the amount of movement by combining ultrasonic signals that are transmitted and received while the ultrasonic transducer is moved, the synthetic aperture beamforming method using a virtual sound source increases the size of the virtual aperture by the amount of movement of the virtual sound source. The synthetic aperture beamforming method using a virtual transmission sound source is disclosed in M. H. Bae, and M. K. Jeong, "Bidirectional Pixel Based Focusing in Conventional B-mode Ultrasound Imaging", Elec. Letters, Vol 24, No. 22, pp. 2105-2107, 1998 and C. H. Frazier and W. D. O'Brien, Jr., "Synthetic aperture techniques with virtual source elements", IEEE Trans. UFFC. Vol. 45, no. 1, pp. 196-207, 1998.

The receiving dynamic beamforming unit 150 dynamically moves a focusing point with a variable time delay being applied to the reception data converted by the analog-to-digital converter 130, thereby synthesizing the reception data.

The beamforming at the time of reception is performed based on the same principle as that of the beamforming at the time of transmission. However, at the time of reception, differently from at the time of transmission, dynamic focusing in which a focusing point dynamically moves by applying a variable time delay simultaneously with the reception may be performed, and accordingly, the beam width at the time of reception is maintained to be narrow in the whole area.

On the other hand, in the transmission focusing, focusing is made at only one point when transmission is performed once. Accordingly, in order to perform transmission focusing for all the image points on a scanning line, while the transmission operation needs to be performed a plurality of times corresponding to the number of all the image points on the scanning line, the transmission focusing at all the image points makes it difficult to implement a real-time image. Accordingly, for the beamforming, a transmission fixed focusing method is used.

Thus, while the synthetic aperture beamforming unit 140 and the receiving dynamic beamforming unit 150 use the received data that has been converted by the analog-to-digital converter 130, the receiving dynamic beamforming unit 150 uses a part of the received data used by the synthetic aperture beamforming unit 140. Therefore, the receiving dynamic beamforming unit 150 may be implemented inside the synthetic aperture beamforming unit 140, or the beamforming units may be separately implemented.

The area data synthesizing unit 160 synthesizes image data generated by the receiving dynamic beamforming unit 150 and image data generated by the synthetic aperture beamforming unit 140 by applying weighting factors according to advancing distances of ultrasonic waves thereto.

In a case where the synthetic aperture beamforming unit 140 uses the synthetic aperture beamforming method using a virtual transmission sound source, the area data synthesizing unit 160 may synthesize the image data generated by the receiving dynamic beamforming unit 150 and the image data generated by the synthetic aperture beamforming unit 140 with weighing factors applied thereto changing in accordance with distances from the virtual transmission sound source.

In other words, for an area adjacent to the virtual transmission sound source, a weighting factor applied to the image data generated using the receiving dynamic beamforming method is increased, a weighting factor applied to the image data generated using the synthetic aperture beamforming method is decreased, and then, the two images are synthesized, whereby the non-uniformity in an area adjacent to the virtual transmission sound source is compensated, and a uniform energy distribution is formed in an area near the virtual transmission sound source.

FIG. 2 is a conceptual diagram that illustrates the calculation amounts according to the receiving dynamic beamforming method and the synthetic aperture beamforming method.

As illustrated in FIG. 2, in the case of the receiving dynamic beamforming method, when the number of reception channels is N, a calculation amount of N is needed. On the other hand, in the case of the synthetic aperture beamforming method, when the number of transmission subapertures used for generating one scanning line is M, a calculation amount of N×M is needed.

Hereinafter, the method for applying weighting factors to the image data generated by the receiving dynamic beamforming unit 150 and the image data generated by the synthetic aperture beamforming unit 140 using the area data synthesizing unit 160 will be described in more detail.

FIG. 3 is a diagram that illustrates an example of an image generated by the synthetic aperture beamforming unit 140 in a case where a transmission focusing distance is 2 cm.

As illustrated in FIG. 3, the occurrence of a grating lobe appears near a point target at a depth of about 0 to 4 cm. The synthetic aperture beamforming method has a disadvantage that a grating lobe occurs at a low depth (0 to 4 cm) in a case where the condition of $\lambda/2$ is not satisfied, and FIG. 3 is an actual image acquired in a case where the element pitch is $\lambda$, and the transmission focusing distance is 2 cm.

FIG. 4 is a diagram that illustrates an example of an image generated by the receiving dynamic beamforming unit 150 in a case where the transmission focusing distance is 2 cm.

As illustrated in FIG. 4, it is understood that a grating lobe is not observed near a point target at a depth of about 0 to 4 cm. FIG. 4 illustrates an image generated using the receiving dynamic beamforming method and, similarly to that illustrated in FIG. 3, is an actual image in a case where the element pitch is $\lambda$, and the transmission focusing distance is 2 cm.

By referring to FIGS. 3 and 4, it is understood that the ultrasonic focusing of the image acquired using the synthetic aperture beamforming method is performed relatively well as a whole. However, in a case where the synthetic aperture beamforming method is used, a grating lobe occurs near the point target at a depth of about 0 to 4 cm. On the other hand, in a case where the receiving dynamic beamforming method is used, a grating lobe does not occur near the point target at a depth of about 0 to 4 cm.

FIG. 5 is a diagram that illustrates an example in which weighting factors are applied to the image data generated by the receiving dynamic beamforming unit 150 and the image data generated by the synthetic aperture beamforming unit 140 by an area data synthesizing unit 160 in accordance with an embodiment of the present disclosure.

As illustrated in FIG. 5, for 0 to 2 cm, a weighting factor of 100% is applied to the image data generated by the receiving dynamic beamforming unit 150, and a weighting factor of 0% is applied to the image data generated by the synthetic aperture beamforming unit 140.

In addition, for 2 to 6 cm, a weighting factor applied to the image data generated by the receiving dynamic beamforming unit 150 linearly decreases, and a weighting factor of applied to the image data generated by the synthetic aperture beamforming unit 140 linearly increases, and the images are synthesized at the same ratio for about 4 cm. Here, the form in which the weighting factor increases or decreases is not limited to a linear function, and various functions may be used depending on embodiments.

According to an embodiment of the present disclosure, a high-resolution image having no grating lobe is acquired by using zone blending. In other words, before 4 cm, the image generated by the receiving dynamic beamforming unit 150 mainly appears, and thereafter, the image generated by the synthetic aperture beamforming unit 140 mainly appears. Here, the position, the area, the form of the slope, or the like of a portion denoted by dotted lines in FIG. 5 may be changed as is necessary.

FIG. 6 is a diagram that illustrates an example of a synthesized image generated in accordance with an embodiment of the present disclosure in a case where the transmission focusing distance is 2 cm.

As illustrated in FIG. 6, a grating lobe near a depth of 0 to 4 cm, which is observed in the case illustrated in FIG. 3, does not appear, and it is understood that the resolution increases depending on the image data generated by the synthetic aperture beamforming unit 140 as the depth increases.

FIG. 7 is a flowchart that illustrates a method for generating a synthetic image according to a preferred embodiment of the present disclosure.

As illustrated in FIG. 7, the method for generating a synthetic image according to this embodiment is configured by operations processed in a time series in the ultrasonic imaging apparatus illustrated in FIG. 1. Thus, although not described hereinafter, the content of the ultrasonic imaging apparatus illustrated in FIG. 1 described above is also applied to the method for generating a synthetic image according to this embodiment.

In operation 700, the ultrasonic imaging apparatus converts an ultrasonic signal reflected at a focusing point into an electrical analog reception signal. Thereafter, the converted electrical analog reception signal may be amplified and be converted into digital reception data.

In operation 710, the ultrasonic imaging apparatus generates image data using a synthetic aperture beamforming method in which the converted reception data is divided into at least one or more groups, the reception data for each group is synthesized, and then, the reception data synthesized for each group is finally synthesized in accordance with a scan line to be generated with mutually-different weighting factors being applied to the reception data.

The synthetic aperture beamforming method employed in operation 710 may be a synthetic aperture beamforming method using a virtual transmission sound source.

In operation 720, the ultrasonic imaging apparatus dynamically moves a focusing point with a variable time delay being applied to the converted reception data, thereby synthesizing the reception data.

In operation 730, the ultrasonic imaging apparatus applies weighting factors according to advancing distances of the ultrasonic waves or weighting factors according to distances from the virtual transmission sound source to the image data generated in operations 710 and 720.

In a case where the synthetic aperture beamforming method is used, a weighting factor applied to the image data generated using the synthetic aperture beamforming method is increased, and a weighting factor applied to the image data generated using the receiving dynamic beamforming method is decreased as the advancing distance of the ultrasonic wave increases. In addition, in a case where the synthetic aperture beamforming method using a virtual transmission sound source is used, for an area adjacent to the virtual transmission sound source, a weighting factor applied to the image data generated using the receiving dynamic beamforming method is increased, and a weighting factor applied to the image data generated using the synthetic aperture beamforming method is decreased.

In operation 740, the ultrasonic imaging apparatus generates synthetized data using the image data generated using the receiving dynamic beamforming method and the image data generated using the synthetic aperture beamforming method.

The method for generating a synthetic image according to an embodiment of the present disclosure may be simply implemented by a synthetic aperture beamforming system having a postpositional memory structure. The reason for this is that, in the process of forming a synthetic beam according to the synthetic aperture beamforming method, a beam used in the receiving dynamic beamforming method is produced.

FIG. 8 is a diagram that illustrates an example of a synthesized image generated in accordance with another embodiment of the present disclosure in a case where the transmission focusing distance is 2 cm, and the position of the virtual transmission sound source is 2 cm.

As illustrated in FIG. 8, in the case of the synthetic aperture beamforming method using a virtual transmission sound source, there is a place at which low transmission energy arrives near the virtual transmission sound source, and accordingly, the ultrasonic image is distributed in a non-uniform manner.

Instead of compensating the area adjacent to the virtual transmission sound source using an appropriate gain, the non-uniformity may be easily solved in a case where a weighting factor applied to the receiving dynamic beamforming image is increased in an area adjacent to the virtual transmission sound source, and the receiving dynamic beamforming image and the synthetic aperture beaming image are synthesized. It is used that an area adjacent to the virtual transmission sound source corresponds to a transmission focusing point in the receiving dynamic beamforming, and there is no decrease in the resolution.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The invention claimed is:

1. A method for generating a synthetic image comprising:
   generating image data using a receiving dynamic beamforming method;
   generating image data using a synthetic aperture beamforming method; and
   synthesizing the image data generated using the receiving dynamic beamforming method and the image data generated using the synthetic aperture beamforming method, wherein weighting factors according to advancing distances of ultrasonic waves are applied to the image data generated using the receiving dynamic beamforming method and the image data generated using the synthetic aperture beamforming method, wherein the weighting factor applied to the image data generated using the synthetic aperture beamforming method is increased in a range of an advancing distance of the ultrasonic wave, and wherein the weighting factor applied to the image data generated using the receiving dynamic beamforming method is decreased in the range.

2. The method for generating a synthetic image according to claim 1, wherein generating image data using the synthetic aperture beamforming method includes generating image data using data received from an analog-to-digital converter, and wherein generating image data using the receiving dynamic beamforming method includes generating image data using only a part of the data received from the analog-to-digital converter.

3. The method for generating a synthetic image according to claim 1, wherein synthesizing the image data generated using the receiving dynamic beamforming method and the image data generated using the synthetic aperture beamforming method includes synthesizing the image data generated using the receiving dynamic beamforming method and the image data generated using the synthetic aperture beamforming method at the same distance in the range.

4. A method for generating a synthetic image comprising:
   generating image data using a receiving dynamic beamforming method;
   generating image data using a synthetic aperture beamforming method using a virtual transmission sound source; and
   synthesizing the image data generated using the receiving dynamic beamforming method and the image data generated using the synthetic aperture beamforming method, wherein weighting factors changing in accordance with a distance from the virtual transmission sound source are applied to the image data generated using the receiving dynamic beamforming method and the image data generated using the synthetic aperture beamforming method, wherein the weighting factor applied to the image data generated using the receiving dynamic beamforming method is increased in an area adjacent to the virtual transmission sound source, and wherein the weighting factor applied to the image data generated using the synthetic aperture beamforming method is decreased in the area.

5. The method for generating a synthetic image according to claim 4, wherein synthesizing the image data generated using the receiving dynamic beamforming method and the image data generated using the synthetic aperture beamforming method includes synthesizing the image data generated using the receiving dynamic beamforming method and the image data generated using the synthetic aperture beamforming method to compensate an non-uniformity in the area and form a uniform energy distribution in the area.

6. The method for generating a synthetic image according to claim 4, wherein the area corresponds to a transmission focusing point used in the receiving dynamic beamforming method.

7. An ultrasonic imaging apparatus comprising:
a receiving dynamic beamforming unit having N reception channels and configured to generate image data using a receiving dynamic beamforming method;
a synthetic aperture beamforming unit having M as the number of subapertures used for generating one scanning line, having N as the number of reception channels, and configured to generate image data using a synthetic aperture beamforming method; and
an area data synthesizing unit configured to synthesize the image data generated by the receiving dynamic beamforming unit and the image data generated by the synthetic aperture beamforming unit, wherein weighting factors according to advancing distances of ultrasonic waves are applied to the image data generated using the receiving dynamic beamforming method and the image data generated using the synthetic aperture beamforming method, wherein the area data synthesizing unit is configured to increase the weighting factor applied to the image data generated by the synthetic aperture beamforming unit in a range of an advancing distance of the ultrasonic wave, and configured to decrease the weighting factor applied to the image data generated by the receiving dynamic beamforming unit in the range.

8. The ultrasonic imaging apparatus according to claim 7, wherein the synthetic aperture beamforming unit is configured to generate image data using data received from an analog-to-digital converter, and wherein the receiving dynamic beamforming unit is configured to generate image data using only a part of the data received from the analog-to-digital converter.

9. The ultrasonic imaging apparatus according to claim 7, wherein the area data synthesizing unit is configured to synthesize the image data generated by the receiving dynamic beamforming unit and the image data generated by the synthetic aperture beamforming unit at the same distance in the range.

10. An ultrasonic imaging apparatus comprising:
a receiving dynamic beamforming unit having N reception channels and configured to generate image data using a receiving dynamic beamforming method;
a synthetic aperture beamforming unit having M as the number of subapertures used for generating one scanning line, having N as the number of reception channels, and configured to generate image data acquired using a synthetic aperture beamforming method using a virtual transmission sound source; and
an area data synthesizing unit configured to synthesize the image data generated by the receiving dynamic beamforming unit and the image data generated by the synthetic aperture beamforming unit, wherein weighting factors changing in accordance with a distance from the virtual transmission sound source are applied to the image data generated using the receiving dynamic beamforming method and the image data generated using the synthetic aperture beamforming method, wherein the area data synthesizing unit is configured to increase the weighting factor applied to the image data generated by the receiving dynamic beamforming unit in an area adjacent to the virtual transmission sound source, and configured to decrease the weighting factor applied to the image data generated by the synthetic aperture beamforming unit in the area.

11. The ultrasonic imaging apparatus according to claim 10, wherein the area data synthesizing unit is configured to synthesize the image data generated by the receiving dynamic beamforming unit and the image data generated by the synthetic aperture beamforming unit to compensate an non-uniformity in the area and form a uniform energy distribution in the area.

12. The ultrasonic imaging apparatus according to claim 10, wherein the area corresponds to a transmission focusing point used in the receiving dynamic beamforming method.

13. A computer program product comprising at least one computer-readable storage medium having computer-executable program code portions stored therein, the computer-executable program code portions comprising program code instructions for:
generating image data using a receiving dynamic beamforming method;
generating image data using a synthetic aperture beamforming method; and
synthesizing the image data generated using the receiving dynamic beamforming method and the image data generated using the synthetic aperture beamforming method, wherein weighting factors according to advancing distances of ultrasonic waves are applied to the image data generated using the receiving dynamic beamforming method and the image data generated using the synthetic aperture beamforming method, wherein the weighting factor applied to the image data generated using the synthetic aperture beamforming method is increased in a range of an advancing distance of the ultrasonic wave, and wherein the weighting factor applied to the image data generated using the receiving dynamic beamforming method is decreased in the range.

14. The computer program product according to claim 13, wherein generating image data using the synthetic aperture beamforming method includes generating image data using data received from an analog-to-digital converter, and wherein generating image data using the receiving dynamic beamforming method includes generating image data using only a part of the data received from the analog-to-digital converter.

15. The computer program product according to claim 13, wherein synthesizing the image data generated using the receiving dynamic beamforming method and the image data generated using the synthetic aperture beamforming method includes synthesizing the image data generated using the receiving dynamic beamforming method and the image data generated using the synthetic aperture beamforming method at the same distance in the range.

16. A computer program product comprising at least one computer-readable storage medium having computer-executable program code portions stored therein, the computer-executable program code portions comprising program code instructions for:
generating image data using a receiving dynamic beamforming method;
generating image data using a synthetic aperture beamforming method using a virtual transmission sound source; and
synthesizing the image data generated using the receiving dynamic beamforming method and the image data generated using the synthetic aperture beamforming method, wherein weighting factors changing in accordance with a distance from the virtual transmission sound source are applied to the image data generated using the receiving dynamic beamforming method and the image data generated using the synthetic aperture beamforming method, wherein the weighting factor applied to the image data generated using the receiving dynamic beamforming method is increased in an area adjacent to the virtual transmission sound source, and wherein the weighting factor applied to the image data generated using the synthetic aperture beamforming method is decreased in the area.

17. The computer program product according to claim 16, wherein synthesizing the image data generated using the receiving dynamic beamforming method and the image data generated using the synthetic aperture beamforming method includes synthesizing the image data generated using the receiving dynamic beamforming method and the image data generated using the synthetic aperture beamforming method to compensate an non-uniformity in the area and form a uniform energy distribution in the area.

18. The computer program product according to claim 16, wherein the area corresponds to a transmission focusing point used in the receiving dynamic beamforming method.

* * * * *